United States Patent [19]

Fraser et al.

[11] 4,425,690
[45] Jan. 17, 1984

[54] AUTOMOBILE FLOOR MAT FASTENER

[75] Inventors: James Y. Fraser, Saratoga Springs; Bob Bailey, Ballston Lake, both of N.Y.

[73] Assignee: Racemark International, Inc., Burnt Hills, N.Y.

[21] Appl. No.: 260,362

[22] Filed: May 4, 1981

[51] Int. Cl.³ .............................................. A44B 9/00
[52] U.S. Cl. ........................................ 24/351; 24/363
[58] Field of Search ................. 24/344, 351, 352, 353, 24/354, 356, 357, 363, 364, 155 CC; 16/4, 5, 16

[56] References Cited

U.S. PATENT DOCUMENTS

| | | | |
|---|---|---|---|
| 212,216 | 2/1879 | Greely | 24/356 |
| 262,710 | 8/1882 | Todd et al. | 24/8 |
| 720,919 | 2/1903 | Hirsch | 24/248 R |
| 736,030 | 8/1903 | Scott | 24/363 |
| 796,879 | 8/1905 | Stokes | 24/302 |
| 892,752 | 7/1908 | Malings | 24/353 |
| 1,707,402 | 4/1929 | Kintz | 24/351 |
| 1,724,090 | 8/1929 | Huntley | 24/299 |
| 1,860,384 | 5/1932 | Cocks | 24/334 |
| 2,253,022 | 8/1941 | Evans | 24/363 |
| 3,300,827 | 1/1967 | Hutton | 24/364 |

FOREIGN PATENT DOCUMENTS

| | | | |
|---|---|---|---|
| 92031 | 9/1896 | Fed. Rep. of Germany | 24/351 |
| 327287 | 6/1903 | France | 24/351 |
| 59657 | 4/1912 | Switzerland | 24/351 |
| 8520 | of 1914 | United Kingdom | 24/363 |

Primary Examiner—John J. Wilson
Attorney, Agent, or Firm—Robert E. Heslin

[57] ABSTRACT

For anchoring a mat to the carpet of an automobile against forward movement, a clip for engaging the mat at its rearward edge is operated by a protector plate which shields the clip from impact while also serving to operate the jaws between an open and a closed position. The clip is linked to a hook so as to permit independent lateral and longitudinal movement by the clip with respect to the hook. The hook has a forward facing pin portion for engaging the automobile carpet and an anchoring stud portion extending substantially perpendicularly to said pin portion also for engaging said carpet and resisting the accidental removal of the pin. The hook is made of a springy material and is so shaped as to cause the carpet to be pinched between the pin portion and another part of the hook, thereby providing additional resistance to the withdrawal of the pin from the carpet.

19 Claims, 4 Drawing Figures

AUTOMOBILE FLOOR MAT FASTENER

BACKGROUND AND SUMMARY OF THE INVENTION

This invention relates to fasteners for anchoring automobile floor mats.

Many automobile owners find it desirable to install floor mats which protect factory installed carpeting from wear and tear and which can be periodically removed and cleaned. However, there is a familiar and long-standing problem associated with the use of automobile floor mats that is both annoying and dangerous. Typically, what happens is that the floor mats gradually migrate out of their proper positions during the normal use and operation of the automobile.

This migration is caused by the normal movements of a passenger's feet which create a variety of forces that act upon the floor mats. First, upon getting into or out of the car, a force is exerted upon the mat primarily in a forward, but also a sideward, direction. Second, when sitting in a car, it is common to find oneself slouching down into the seat. To straighten up, one generally pushes forward with his feet which, in turn, exerts a forward force on the floor mat. Still another type of force applied to a floor mat is a backwards force which occurs any time a person draws his feet rearwardly toward his seat on the floor mat. Of these various forces acting upon the floor mats in the automobile, those which are directed forwardly of the automobile seem to be the most common. The result is that the mats in the front seat area ride up against the forward wall of the passenger compartment while those in the back seat area often wind up under the front seat. A safety hazard is involved here because the driver's mat, once it moves forward, tends to interfere with the operation of the accelerator and brake pedals. Also, once dislocated, the floor mats cease to serve their protective function since those portions of the factory installed carpeting which are no longer covered become subject to wear and tear.

Prior to this invention, a number of unsuccessful attempts had been made to solve this problem. One attempt involved using VELCRO brand fasteners to fasten the mats in position. It was found, however, that the aforementioned forces had somewhat of a pulling and peeling character, typical of the action used to intentionally separate VELCRO fasteners. Thus, normal usage of even a short duration resulted in the detaching of the VELCRO fasteners and migration of the floor mats. Many manufacturers have attempted to avoid the problem altogether by preparing standard automobile carpeting with vinyl areas in front of the driver's seat, especially around the gas pedal. However, this has not been particularly satisfying since those who wish to preserve the original appearance of the factory installed floor covering must still use floor mats.

The present invention, however, solves the problem of fastening automobile floor mats by using a special clip and hook combination incorporating a number of unique features set forth below. The clip engages the rear edge of the mat while the hook is imbedded in the factory installed auto carpeting so as to prevent forward movement. The clip and hook are linked in a special way which takes account of the various forward, sideward and rearward forces mentioned above by providing a certain amount of "play" between the clip and hook. Also means are provided for inhibiting the removal of the hook once it is imbedded in the carpeting.

What has been discovered is that overall combination of these features results in a highly reliable floor mat fastener which is effective to maintain the mat in its proper position while not easily becoming dislodged by the random forces and movements to which the mat is subjected.

In addition to dealing with the various forces which are exerted on the mat, it has been found that the clip is subject to a substantial amount of wear which often includes being stepped on. The present invention, however, is able to withstand this wear through the employment of a dual purpose protector plate which not only lies above and covers the clip, but also acts as the means for operating the clip between its open and closed positions.

Briefly described, a clip, which can be similar to a suspender clip, is used to engage an automobile floor mat at its rearward-facing edge. A protector plate lies above the clip and serves the dual function of shielding the clip while also acting as a lever to operate the clip between an open and a closed position. A hook for completing the connection between the mat and the carpet is linked to the clip so as to prevent forward movement of the mat while permitting a reasonable amount of sideward and rearward movement. The hook consists of a pin portion which is inserted into and runs beneath the carpet and an anchoring stud portion which extends perpendicularly to the pin and into the nap of the carpet. Once inserted beneath the carpet, the pin portion and hook act as a pincer, further securing the carpet therebetween. The pin, pincer, and anchoring stud combine so as to absorb the random forces and movements of the mat thereby preventing the unintentional removal of the hook from the carpeting.

DETAILED DESCRIPTION OF THE DRAWINGS

Figure 1:
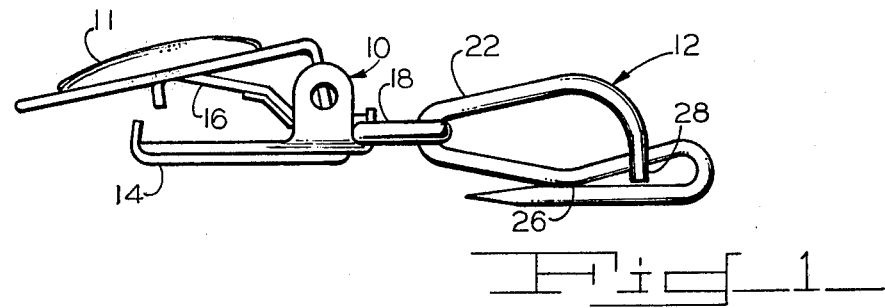
FIG. 1 is a side view of the invention with the clip closed.
Figure 2:
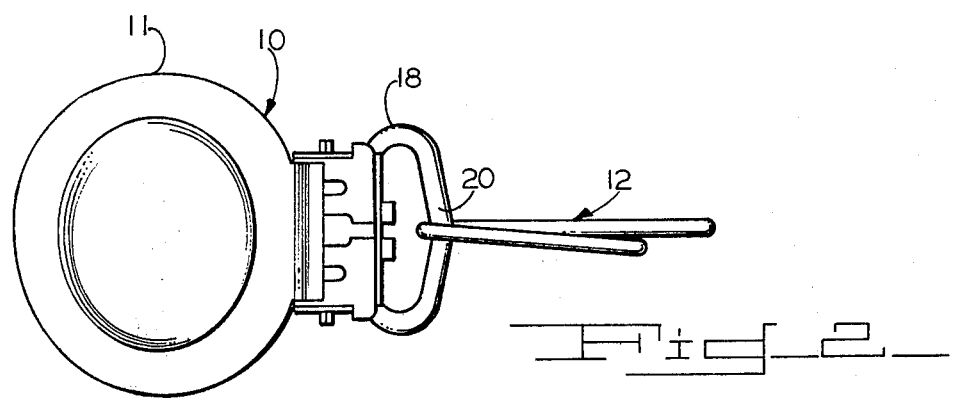
FIG. 2 is a partial plan view of the top of the invention.
Figure 3:
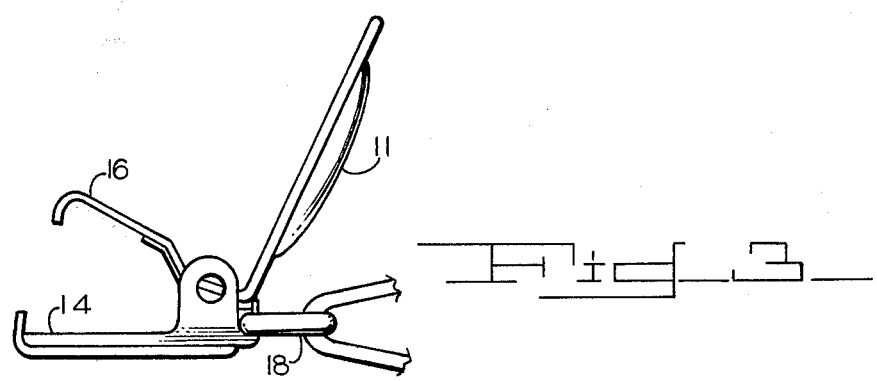
FIG. 3 is a partial side view of the invention with the clip opened.

The invention as shown in FIGS. 1 and 2, comprises a clip generally designated as 10, a protector plate 11, and a hook generally designated as 12.

The clip is of the type commonly used with suspenders having a lower jaw 14 and an upper jaw 16 which are hingedly connected so as to be operable between an open and closed position in a manner familiar to those skilled in the art. A protector plate 11 is attached to the clip and serves to shield the clip while also acting as the operative means whereby the clip is opened or closed.

A D-ring 18 is mounted on and generally lies rearwardly of the clip 10. The D-ring 18 is provided with an angle point 20 located at the center of the rearmost portion of the ring. See FIG. 2.

Mounted to said D-ring is a hook 12 which consists of an attachment loop 22 connected to the ring 18 so as to allow movement therebetween without creating undue stress upon the hook. A pin portion 24 extends and points forwardly toward the clip 10, and comes in contact with the bottom of the loop 22 so as to form a pincer 26. Hook 12 is preferably made of a springy material and the purpose of pincer 26 is to squeeze against the carpeting trapped therein so as to resist the unintentinal withdrawal of the pin 24 from the carpeting. Also, a blunt-tipped anchoring stud 28 extends in a substantially perpendicular direction to the pin portion 24 and into the nap of the carpet so as to add additional resistance to the accidental removal of the pin from the carpet. Thus, stud 28 creates a frictional drag against the rearward movement of the hook 12.

Figure 4:
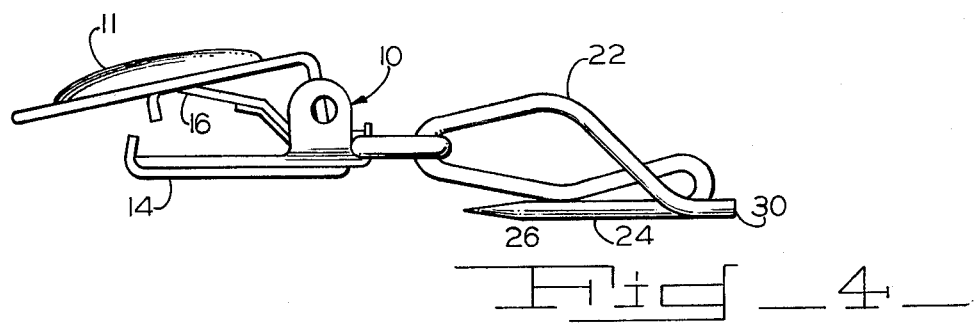
FIG. 4 is a side view of the invention showing an alternate embodiment of the hook.

An alternate embodiment of the hook is shown in FIG. 4 in which the anchoring stud 28 is replaced with a backstop 30. As shown, backstop 30 extends in a substantially opposite direction from the pin 24 so as to more directly engage the carpet, thereby preventing any unintentional withdrawal of the pin.

In operation, the protector plate 11 acts as a lever for closing the clip and engaging the mat. The pin portion 24 of the hook 12 is inserted into and slid beneath the carpet. To secure the hook in position, the anchoring stud 28 extends perpendicularly to the pin portion 24 and serves to engage the carpet thereby resisting the accidental withdrawal of the pin which might otherwise be caused by the random forces and movements to which the mat is subjected. The hook is further stabilized in that the carpet is wedged in pincer 26 described above. The linking of the clip 10 and hook 12 along with the pin and anchoring stud combination serve to not only secure the mat but also to allow for the normal movements of the mat without creating undue stress upon the hook or carpet.

Changes and modifications in the specifically described embodiments can be carried out without departing from the scope of the invention which is intended to be limited only by the scope of the appended claims.

What is claimed is:

1. An automobile floor mat fastener for anchoring a mat at its rearward-facing edge to an automobile carpet comprising:
    a clip having jaws at one end operable between an open position defining an opening and a closed position for engaging the rearward-facing edge of the mat to be anchored and having a linking end opposite said jaws;
    a hook having a linking end and a hook end opposite said linking end; and
    linkage means connecting said clip and said hook at their respective ends in an aligned position while permitting independent lateral and longitudinal movement by the clip with respect to the hook without the hook becoming unlinked from the clip, whereby the connection between said clip and said hook ends will normally maintain them in an aligned position during use, said hook having a portion extending from the linking end to the hook end and turning back toward the linking end forming said hook and terminating in an open-ended pin portion adapted to be inserted into the carpet so as to point forwardly of the automobile toward the mat engaged by the clip and anchor the fastener to the carpet, said opening defined by said jaws and said open-ended pin portion facing substantially the same direction when said clip and hook are in the aligned position, whereby a force tending to pull said mat from said jaws along the aligned position will pull the hook in its hooked direction and thereby prevent disengagement of the fastener.

2. The invention of claim 1 wherein the hook includes means for resisting the unintentional withdrawal of the pin portion from the carpeting.

3. The invention of claim 2 wherein the hook is made of a continuous piece of springy material and wherein the hook includes a loop portion for engaging the clip and wherein the resisting means includes a pincer formed between the loop portion and the pin portion for squeezing carpeting captured therebetween.

4. An automobile floor mat fastener for anchoring a mat at its rearward-facing edge to an automobile carpet comprising:
    a clip operable between an open and closed position for engaging the rearward-facing edge of the mat to be anchored; and
    a hook linked to the clip so as to permit independent lateral and longitudinal movement by the clip with respect to the hook without the hook becoming unlinked from the clip, said hook having an open-ended pin portion adapted to be inserted into the carpet so as to point forwardly of the automobile toward the mat engaged by the clip, said hook also having an anchoring stud portion extending substantially perpendicularly to said pin portion so as to engage the carpet and thereby resist the unintentional withdrawal of the pin from the carpeting.

5. The invention of claim 4 further comprising:
    a protector plate fastened to the clip for operating the clip between an open and a closed position, said protector plate also being adapted to lie above and cover the clip and receive any impact thereon.

6. The invention of claim 5 wherein a clip mounted D-ring extends behind the clip for engagement by the loop portion of the hook.

7. The invention of claim 6 wherein said clip mounted D-ring includes an angle point located at the rearmost part of the D-ring for centering the hook if and when the mat moves forwardly.

8. An automobile floor mat fastener for anchoring a mat at its rearward-facing edge to an automobile carpet comprising:
    a clip operable between an open and closed position for engaging the rearward-facing edge of the mat to be anchored; and
    a hook linked to the clip so as to permit independent lateral and longitudinal movement by the clip with respect to the hook without the hook becoming unlinked from the clip, said hook having an open-ended pin portion adapted to be inserted into the carpet so as to point forwardly of the automobile toward the mat engaged by the clip, said hook including a backstop portion extending in a substantially opposite direction to said pin portion so as to engage the carpet if and when the hook moves rearwardly and to thereby resist the unintentional withdrawal of the pin from the carpeting.

9. The invention of claim 8 further comprising:
    a protector plate fastened to the clip for operating the clip between an open and closed position, said protector plate being adapted to lie above and cover the clip and receive any impact thereon.

10. The invention of claim 9 wherein a clip mounted D-ring extends behind the clip for engagement by the loop portion of the hook.

11. The invention of claim 10 wherein said clip mounted D-ring includes an angle point located at the rearmost part of the D-ring for centering the hook if and when the mat moves forwardly.

12. An automobile floor mat fastener for anchoring a mat at its rearward-facing edge to an automobile carpet comprising:
- a clip operable between an open and closed position for engaging the rearward-facing edge of the mat to be anchored; and
- a hook linked to the clip so as to permit independent lateral and longitudinal movement by the clip with respect to the hook, said hook having an open-ended pin portion adapted to be inserted into the carpet so as to point forwardly of the automobile toward the mat engaged by the clip, said hook being made of a continuous piece of springy material and wherein the hook includes a loop portion for engaging the clip and a pincer formed between the loop portion and the pin portion for squeezing carpeting encaptured therebetween, said hook also including an anchoring stud portion extending substantially perpendicularly to said pin portion so as to engage the carpet and thereby resist the unintentional withdrawal of the pin from the carpeting.

13. The invention of claim 12 further comprising:
- a protector plate fastened to the clip for operating the clip between an open and a closed position, said protector plate also being adapted to lie above and cover the clip and receive any impact thereon.

14. The invention of claim 13 wherein a clip mounted D-ring extends behind the clip for engagement by the loop portion of the hook.

15. The invention of claim 14 wherein said clip mounted D-ring includes an angle point located at the rearmost part of the D-ring for centering the hook if and when the mat moves forwardly.

16. An automobile floor mat fastener for anchoring a mat at its rearward-facing edge to an automobile carpet comprising:
- a clip operable between an open and closed position for engaging the rearward-facing edge of the mat to be anchored; and
- a hook linked to the clip so as to permit independent lateral and longitudinal movement by the clip with respect to the hook without the hook becoming unlinked from the clip, said hook being made of a continuous piece of springy material and wherein the hook includes a loop portion for engaging the clip and pincer formed between the loop portion and the pin portion for squeezing carpeting captured therebetween, said hook also including a backstop portion extending in a substantially opposite direction to said pin portion so as to engage the carpet if and when the hook moves rearwardly and to thereby resist the unintentional withdrawal of the pin from the carpeting.

17. The invention of claim 16 further comprising:
- a protector plate fastened to the clip for operating the clip between an open and closed position, said protector plate being adapted to lie above and cover the clip and receive any impact thereon.

18. The invention of claim 17 wherein a clip mounted D-ring extends behind the clip for engagement by the loop portion of the hook.

19. The invention of claim 18 wherein said clip mounted D-ring includes an angle point located at the rearmost part of the D-ring for centering the hook if and when the mat moves forwardly.

* * * * *